United States Patent
Nagayama et al.

(10) Patent No.: US 11,537,098 B2
(45) Date of Patent: Dec. 27, 2022

(54) CUTTING MACHINE AND CUTTING METHOD INCLUDING TOOL RADIUS COMPENSATION RELATIVE TO A LASER PATH

(71) Applicant: Amada Co., Ltd., Kanagawa (JP)

(72) Inventors: Takehiro Nagayama, Kanagawa (JP); Kazuhiro Kanno, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 26 days.

(21) Appl. No.: 17/256,041

(22) PCT Filed: Jun. 4, 2019

(86) PCT No.: PCT/JP2019/022105
§ 371 (c)(1),
(2) Date: Dec. 24, 2020

(87) PCT Pub. No.: WO2020/008779
PCT Pub. Date: Jan. 9, 2020

(65) Prior Publication Data
US 2021/0124330 A1     Apr. 29, 2021

(30) Foreign Application Priority Data
Jul. 6, 2018   (JP) .............................. JP2018-128917

(51) Int. Cl.
*G05B 19/18*   (2006.01)

(52) U.S. Cl.
CPC .. *G05B 19/182* (2013.01); *G05B 2219/45041* (2013.01)

(58) Field of Classification Search
CPC ........ G05B 19/182; G05B 2219/45041; B23K 26/38; B23K 26/00; B23K 26/032
See application file for complete search history.

(56) References Cited

U.S. PATENT DOCUMENTS

| | | | | |
|---|---|---|---|---|
| 10,859,997 | B1 * | 12/2020 | Miles | G05B 19/401 |
| 2010/0200552 | A1 * | 8/2010 | Mienhardt | B23K 26/38 |
| | | | | 219/121.72 |

(Continued)

FOREIGN PATENT DOCUMENTS

| | | |
|---|---|---|
| JP | 60-129804 A | 7/1985 |
| JP | 03-155484 A | 7/1991 |

(Continued)

OTHER PUBLICATIONS

International Search Report for corresponding Application No. PCT/JP2019/022105, dated Aug. 27, 2019.

(Continued)

*Primary Examiner* — Alicia M. Choi
(74) *Attorney, Agent, or Firm* — Renner, Otto, Boisselle & Sklar, LLP (57) ABSTRACT

A cutting machine is provided with a machine main body and an NC device. The NC device controls the machine main body and has a tool radius compensation amount calculation unit, a machining path calculation unit, and a drive control unit. The tool radius compensation amount calculation unit generates tool radius compensation information. The machining path calculation unit generates a tool radius compensation control signal. The drive control unit generates a drive control signal. The machine main body has a machining unit and a tool path control unit. The machining unit cuts a workpiece by changing a relative position thereof with respect to the workpiece. Based on the drive control signal, the tool path control unit controls a tool path corresponding to a cutting tool and having a non-circular shape.

9 Claims, 7 Drawing Sheets

(56) References Cited

U.S. PATENT DOCUMENTS

| | | | |
|---|---|---|---|
| 2010/0264122 A1 | 10/2010 | Lee et al. | |
| 2011/0120982 A1* | 5/2011 | Sepp | B23K 26/1476 |
| | | | 219/121.72 |
| 2014/0060271 A1* | 3/2014 | Norberg Ohlsson | ......................... |
| | | | B23K 37/0235 |
| | | | 83/13 |
| 2014/0291308 A1* | 10/2014 | Lasagni | G02B 27/00 |
| | | | 219/121.75 |
| 2015/0209898 A1* | 7/2015 | Kim | B23K 26/0006 |
| | | | 65/355 |
| 2019/0225530 A1* | 7/2019 | Bohme | C03B 33/0222 |
| 2020/0156184 A1* | 5/2020 | Regaard | B23K 26/043 |

FOREIGN PATENT DOCUMENTS

| | | | | |
|---|---|---|---|---|
| JP | 1995-015179 U | | 3/1995 | |
| JP | 2000-225415 A | | 8/2000 | |
| JP | 2001-079680 A | | 3/2001 | |
| JP | 2011025272 A | * | 2/2011 | ............ B23K 26/00 |
| JP | 2014-217875 A | | 11/2014 | |
| JP | 2015-174096 A | | 10/2015 | |
| JP | 2017029611 A | * | 2/2017 | |
| JP | 6087483 B | | 3/2017 | |
| WO | WO-2017199410 A1 | * | 11/2017 | ............ B23K 26/02 |

OTHER PUBLICATIONS

Written Opinion for corresponding Application No. PCT/JP2019/022105, dated Aug. 27, 2019.

Extended European Search Report for corresponding EP Application No. 19831452.8 dated Aug. 5, 2021.

\* cited by examiner

CUTTING MACHINE AND CUTTING METHOD INCLUDING TOOL RADIUS COMPENSATION RELATIVE TO A LASER PATH

TECHNICAL FIELD

The present disclosure relates to a cutting machine such as a laser machining device that machines a workpiece by radiating a laser beam, and a cutting method.

BACKGROUND ART

As a cutting machine, a laser machining device that machines a workpiece by radiating a laser beam so that a product having a predetermined shape is produced has been widely used. The laser machining device cuts the workpiece with tool radius compensation in consideration of a cutting amount by the laser beam so that the product with the predetermined shape is produced. Patent Literature 1 describes an example of the laser machining device that cuts a workpiece with the tool radius compensation.

CITATION LIST

Patent Literature

Patent Literature 1: Japanese Patent No. 6087483

SUMMARY

In a laser machining device in a state in which the relative position between a nozzle that emits a laser beam and a machining table on which a workpiece is mounted is fixed, the laser beam usually has a circular shape, and as a result, the cutting trace also has a circular shape. Even in a machining center provided with a plurality of types of rotary tools, in a state in which the coordinates of a position of the rotary tool are fixed, the cutting trace thereof usually has a circular shape. Also, in a water jet machining device, in a state in which the coordinates of a position at which high-pressure water is ejected are fixed, the cutting trace thereof usually has a circular shape. Therefore, the tool radius compensation assumes that the cutting trace has a circular shape in a state in which the coordinates of the position of the cutting tool such as the nozzle, the rotary tool, or the high-pressure water are fixed.

For this reason, a cutting machine such as a laser machining device controls a path at the time of cutting a workpiece by setting an amount corresponding to a half of the diameter of a cutting trace with a cutting tool or an amount corresponding to a half of the width of the cutting trace therewith as a tool radius compensation amount, and then shifting the cutting tool by the tool radius compensation amount. Generally, in a conventional cutting machine, the tool radius compensation is not applicable to a case in which the cutting trace has a non-circular shape.

An object of one or more embodiments is to provide a cutting machine and a cutting method capable of accurately compensating a tool radius of a cutting tool, even when a cutting trace has a non-circular shape in a state in which the coordinates of a position of the cutting tool are fixed.

According to a first aspect of the one or more embodiments, there is provided a cutting machine including a machine main body configured to cut a workpiece and an NC device configured to control the machine main body, wherein the NC device has a tool radius compensation amount calculation unit configured to generate tool radius compensation information for compensating a tool radius of a cutting tool configured to cut the workpiece based on a machining program and a machining condition set based on product shape information including dimensions and a shape of a final machined product obtained by cutting the workpiece, a machining path calculation unit configured to generate a tool radius compensation control signal including a cutting compensation condition based on the machining program, the machining condition, and the tool radius compensation information, and a drive control unit configured to generate a drive control signal for controlling the machine main body based on the tool radius compensation control signal, and the machine main body has a machining unit configured to cut the workpiece by changing a relative position thereof with respect to the workpiece, and a tool path control unit configured to control a tool path based on the drive control signal, the tool path corresponding to the cutting tool and having a non-circular shape.

According to a second aspect of the one or more embodiments, there is provided a cutting method including setting a machining program and a machining condition based on product shape information including dimensions and a shape of a final machined product obtained by cutting a workpiece, generating tool radius compensation information for compensating a tool radius of a cutting tool configured to cut the workpiece based on the machining program and the machining condition, generating a tool radius compensation control signal including a cutting compensation condition based on the machining program, the machining condition, and the tool radius compensation information, generating a drive control signal for controlling a machine main body based on the tool radius compensation control signal, and controlling a tool path based on the drive control signal, the tool path corresponding to a cutting tool configured to cut the workpiece and having a non-circular shape.

According to the cutting machine and the cutting method of the one or more embodiments, the tool radius of the cutting tool can be accurately compensated, even when the cutting trace has a non-circular shape in a state in which the coordinates of the position of the cutting tool are fixed.

DESCRIPTION OF EMBODIMENT

Hereinafter, the cutting machine and the cutting method according to the one or more embodiments will be described with reference to the accompanying drawings. As an example of the cutting machine and the cutting method, a laser machining device and a laser machining method will be described.

Figure 1:
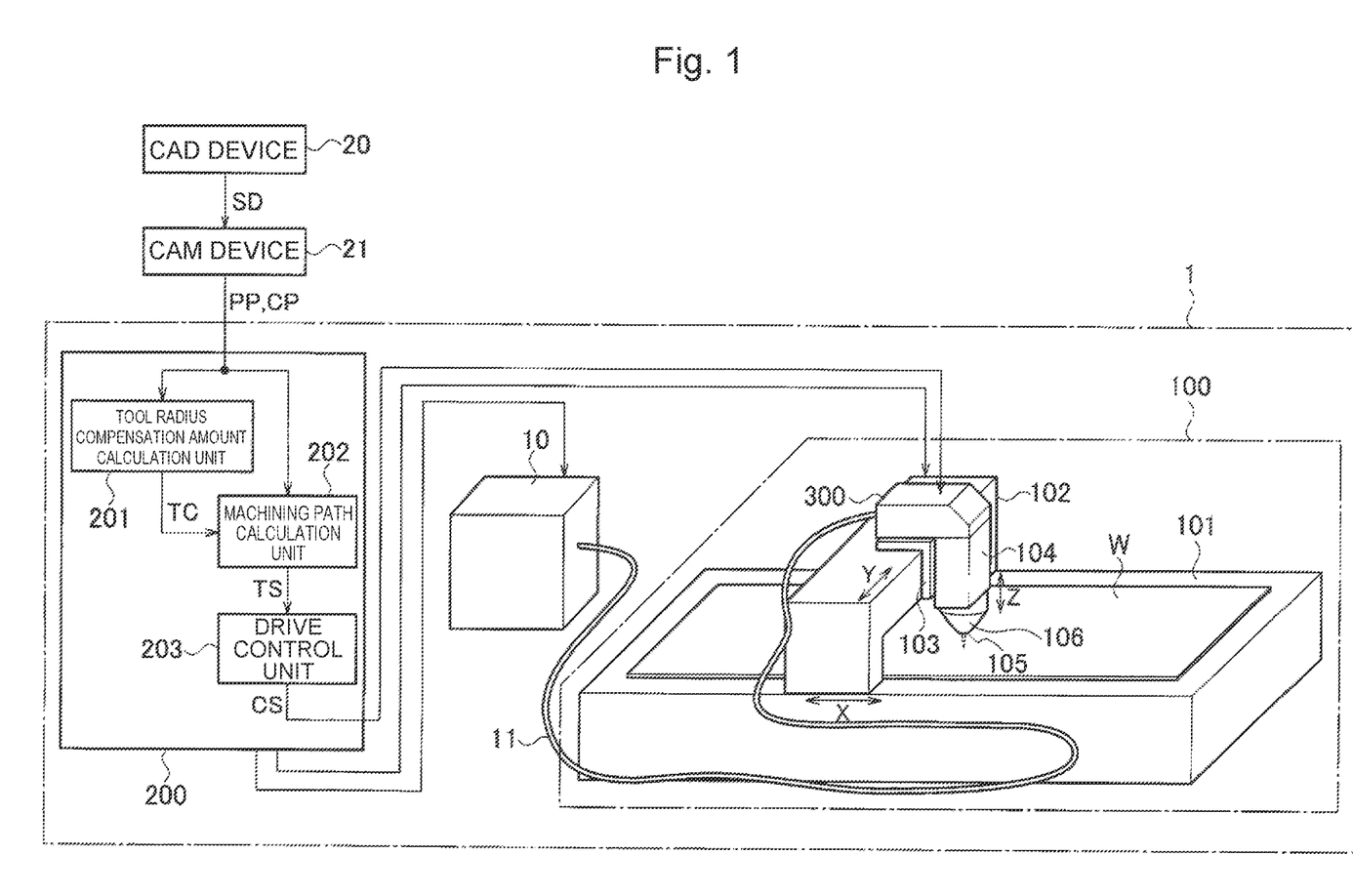
FIG. 1 is a diagram showing an entire configuration example of the cutting machine according to the one or more embodiment.

As shown in FIG. 1, a cutting machine 1 is provided with a laser oscillator 10, a machine main body 100, and an NC device (numerical control device) 200. The NC device 200 controls the laser oscillator 10 and the machine main body 100. The laser oscillator 10 generates and emits a laser beam. The laser beam emitted from the laser oscillator 10 is transmitted to the machine main body 100 via a process fiber 11. The machine main body 100 cuts a workpiece W by radiating the laser beam to the workpiece W and changing a relative position between the workpiece W and a beam spot of the laser beam.

As the laser oscillator 10, a laser oscillator that amplifies an excitation beam emitted from a laser diode and then emits a laser beam of a predetermined wavelength, or a laser oscillator that directly uses a laser beam emitted from a laser diode is preferable. The laser oscillator 10 is, for example, a solid-state laser oscillator, a fiber laser oscillator, a disk laser oscillator, or a direct diode laser oscillator (DDL oscillator).

The laser oscillator 10 emits a 1 μm band laser beam having a wavelength of 900 nm to 1100 nm. Taking the fiber laser oscillator and the DDL oscillator as examples, the fiber laser oscillator emits a laser beam having a wavelength of 1,060 nm to 1,080 nm, and the DDL oscillator emits a laser beam having a wavelength of 910 nm to 950 nm.

The machine main body 100 has a machining table 101 on which the workpiece W is mounted, a gate type X-axis carriage 102, a Y-axis carriage 103, a machining unit 104, and a tool path control unit 300. The workpiece W is a sheet metal made of, for example, stainless steel. The workpiece may be a ferrous sheet metal other than the stainless steel, or may be a sheet metal made of aluminum, aluminum alloy, copper steel, or the like.

The laser beam emitted from the laser oscillator 10 is transmitted to the machining unit 104 of the machine main body 100 via the process fiber 11. The tool path control unit 300 is housed inside the machining unit 104.

The X-axis carriage 102 is configured to be movable in the X-axis direction on the machining table 101. The Y-axis carriage 103 is configured to be movable in the Y-axis direction that is orthogonal to the X-axis on the X-axis carriage 102. The X-axis carriage 102 and the Y-axis carriage 103 function as moving mechanisms to move the machining unit 104 in the X-axis direction, the Y-axis direction, or any combined direction of the X-axis and the Y-axis along the surface of the workpiece W.

Instead of moving the machining unit 104 along the surface of the workpiece W, the machine main body 100 may be configured such that the machining unit 104 has a fixed position and the workpiece W moves. The machine main body 100 only needs to be provided with a moving mechanism that moves the machining unit 104 relatively with respect to the surface of the workpiece W.

A nozzle 106 is attached to the machining unit 104. A circular opening portion 105 is formed at a tip portion of the nozzle 106. The laser beam transmitted to the machining unit 104 is emitted from the opening portion 105 of the nozzle 106 and applied to the workpiece W.

The machining unit 104 is supplied with assist gas such as nitrogen or air. The assist gas may be oxygen, and the mixing ratio between the nitrogen and the oxygen can be arbitrarily set depending on whether the purpose is to suppress oxidation or to utilize an oxidation reaction heat. The laser beam is applied from the opening portion 105 to the workpiece W, and the assist gas is blown from the opening portion 105 onto the workpiece W. The assist gas discharges a melt that is the melted workpiece W in a kerf width.

The tool path control unit 300 functions as a beam vibration mechanism that vibrates, in a non-circular vibration pattern, the laser beam traveling in the machining unit 104 and emitted from the opening portion 105. As the tool path control unit 300 vibrates the laser beam in the non-circular vibration pattern, the machining unit 104 cuts the workpiece W with the non-circular tool path. A specific configuration example of the tool path control unit 300 and a method in which the tool path control unit 300 vibrates a beam spot of the laser beam in the non-circular vibration pattern will be described later.

Here, the tool path is a figure drawn by a path of a beam, which is caused by beam vibration vibrated in the non-circular vibration pattern within a predetermined period of time, and represents a vibrating tool shape. In other words, the circular laser beam emitted from the nozzle 106 itself is typically a cutting tool, and a half of the beam diameter is an amount of the tool radius compensation. Here, however, the tool path of the figure drawn in the vibration pattern is defined as the cutting tool. In a state in which the relative position between the nozzle 106 and the machining table 101 is fixed, the cutting trace corresponds to the tool path.

A CAD (Computer Aided Design) device 20 generates product shape data (CAD data) SD based on product shape information including dimensions and a shape of a final machined product that is obtained by cutting the workpiece W, and outputs the product shape data SD to a CAM (Computer Aided Manufacturing) device 21. The CAM device 21 generates, based on the product shape data SD, a machining program (NC data) PP that is for the cutting machine 1 to cut the workpiece W, and specifies a machining condition CP. In other words, the machining program PP and the machining condition CP are set based on the product shape information including the dimensions and the shape of the final machined product.

The machining program PP includes a G code specified by G41 (left tool radius compensation) that controls the path of the cutting tool by shifting the cutting tool to the left side in the cutting travelling direction by the tool radius compensation amount, or G42 (right tool radius compensation) that controls the path of the cutting tool by shifting the cutting tool to the right side in the cutting travelling direction by the tool radius compensation amount.

The CAM device 21 specifies the tool path that corresponds to the cutting tool as the machining condition CP. The tool path has, for example, a non-circular shape. The CAM device 21 can specify a plurality of tool paths having different shapes or different tool diameters. The machining condition CP includes workpiece information in which material parameters such as a material and a thickness of the workpiece W are specified. The machining condition CP includes machining parameters such as an output of the laser beam, a machining speed, and a diameter of the opening portion 105 of the nozzle 106 (a nozzle diameter) as well as cutting information such as an assist gas condition. In other words, the machining condition CP includes cutting tool information such as the tool path, the workpiece information, and the cutting information.

The CAM device 21 outputs the machining program PP and the machining condition CP to the NC device 200 of the cutting machine 1. The NC device 200 controls the laser oscillator 10 based on the machining program PP and the machining condition CP. The NC device 200 controls the machine main body 100 to drive the X-axis carriage 102 and the Y-axis carriage 103 based on the machining program PP and the machining condition CP so that the nozzle 106 is moved to an intended position.

The NC device 200 controls the tool path control unit 300 based on the machining program PP and the machining condition CP so that the path of the beam spot of the laser beam emitted from the opening portion 105 of the nozzle 106 is controlled. The path of the beam spot corresponds to the tool path.

The NC device 200 has a tool radius compensation amount calculation unit 201, a machining path calculation unit 202, and a drive control unit 203. The machining program PP and the machining condition CP are inputted from the CAM device 21 to the tool radius compensation amount calculation unit 201 and the machining path calculation unit 202. The tool radius compensation amount calculation unit 201 generates tool radius compensation information TC for compensating the tool radius of the cutting tool configured to cut the workpiece W based on the machining program PP and the machining condition CP.

Figure 2:
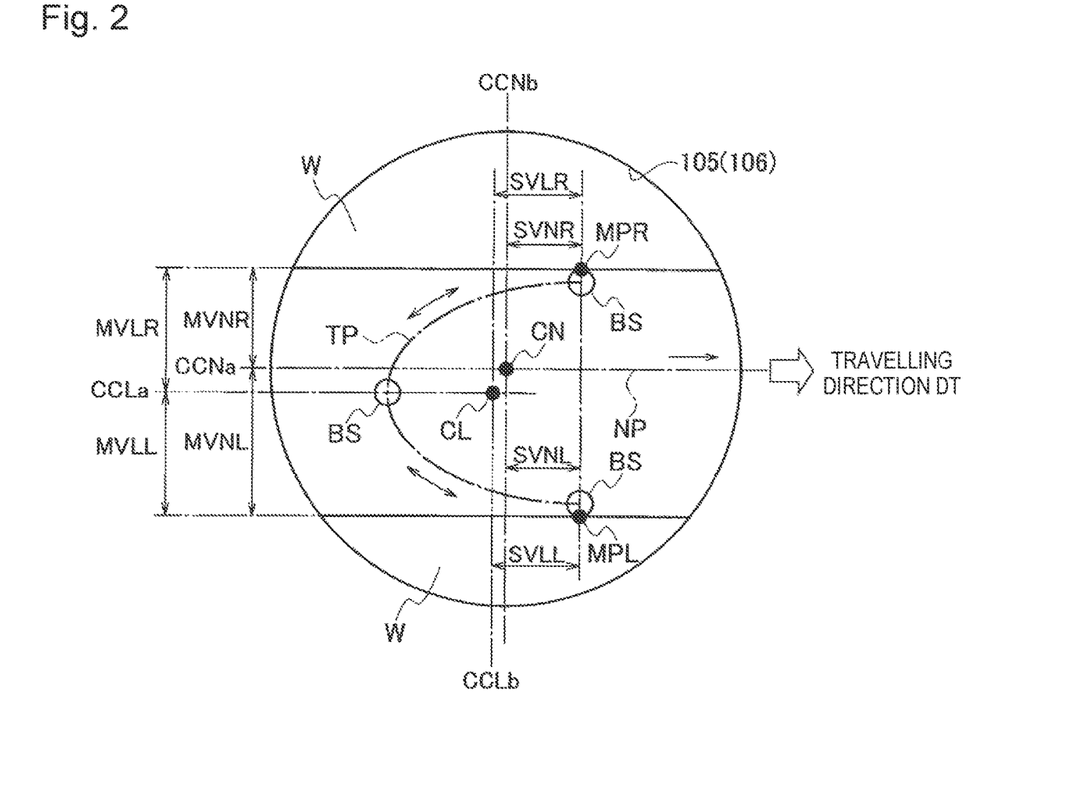
FIG. 2 is a diagram showing a relationship between the nozzle and the tool path.

The tool radius compensation information TC will be described with reference to FIG. 2. FIG. 2 shows a path of the beam spot of the laser beam emitted from an inside of the nozzle 106 through the opening portion 105 thereof to the workpiece W (a tool path).

The tool radius compensation amount calculation unit 201 recognizes a tool path TP included in the machining condition CP. The tool radius compensation amount calculation unit 201 generates the tool radius compensation information TC based on the recognized tool path TP, a path NP of the nozzle 106 (hereinafter, referred to as the nozzle path NP), and a cutting travelling direction DT. The tool path TP corresponds to the cutting tool configured to cut the workpiece W. The shape of the tool path TP corresponds to the shape of the cutting tool. The tool path TP has, for example, a non-circular shape.

The tool radius compensation information TC includes a control center point CL in the tool path TP, machining surface formation positions MPL and MPR, tool radius compensation values MVLL and MVLR, and offset values SVLL and SVLR. In addition, the tool radius compensation information TC includes a center point CN of the nozzle 106 in the nozzle path NP (hereinafter, referred to as the nozzle center point CN), tool radius compensation values MVNL and MVNR, and offset values SVNL and SVNR. It should be noted that the control center point CL corresponds to a center of the laser beam in the case of the tool radius compensation of general laser machining. In the one or more embodiments, since the tool path is the cutting tool having a non-circular shape, the control center point CL is a center position at which the cutting tool is controlled with respect to a cutting line (a cutting position) when the cutting line is a boundary between the cutting tool and the product. The nozzle path NP is specifically a path of the nozzle center point CN. The center point CN of the nozzle 106 coincides with the center point of the opening portion 105.

Reference characters CCNa and CCNb shown in FIG. 2 denote the center lines of the nozzle 106. The center line CCNa is parallel to the traveling direction DT, and the center line CCNb is perpendicular to the traveling direction DT. Reference character BS shown in FIG. 2 denotes a beam spot of the laser beam moving in the tool path TP. FIG. 2 shows the tool path TP in a vibration pattern in which the beam spot BS is vibrated so that the beam spot BS draws an alphabet letter C as an example of the non-circular shape. It should be noted that the vibration pattern of the tool path TP may be any free shape including the non-circular shape.

In the case of the laser machining device, the tool path TP corresponds to the path of the beam spot BS of the laser beam. The beam spot BS moves in a reciprocal motion on the tool path TP. Alternatively, the beam spot BS may move periodically if it has a non-circular shape. The machining surface formation positions MPL and MPR correspond to the positions where the distance from the center line CCLa, which passes the control center point CL and is parallel to the traveling direction DT, to the beam spot BS is maximum in the tool path TP.

The machining surface formation positions MPL and MPR are positions where a machining surface is formed on the workpiece W when the tool path TP moves in the cutting travelling direction DT. In other words, the machining surface formation positions MPL and MPR are the positions where the tool radius is maximum in the tool path TP.

The machining surface formation positions MPL and MPR correspond to the positions where the distance from the center line CCNa, which passes the nozzle center point CN and is parallel to the traveling direction DT, is maximum in the nozzle path NP. In other words, the machining surface formation positions MPL and MPR are the positions where the tool radius is maximum in the nozzle path NP. The machining surface formation position MPL is a parameter in the left tool radius compensation, and the machining surface formation position MPR is a parameter in the right tool radius compensation.

The tool radius compensation values MVLL and MVLR in the tool path TP correspond to the distances from the center line CCLa to the machining surface formation positions MPL and MPR. The tool radius compensation values MVLL and MVLR in the tool path TP correspond to the tool radius in the tool path TP.

The tool radius compensation values MVNL and MVNR in the nozzle path NP correspond to the distances from the center line CCNa to the machining surface formation positions MPL and MPR. The tool radius compensation values MVNL and MVNR in the nozzle path NP correspond to the tool radius in the nozzle path NP. The tool radius compensation values MVLL and MVNL are parameters in the left tool radius compensation, and the tool radius compensation values MVLR and MVNR are parameters in the right tool radius compensation.

The offset values SVLL and SVLR in the tool path TP correspond to the distances from the center line CCLb, which passes the control center point CL and is perpendicular to the traveling direction DT, to the machining surface formation positions MPL and MPR. The offset values SVNL and SVNR in the nozzle path NP correspond to the distances from the center line CCNb, which passes the nozzle center point CN and is perpendicular to the traveling direction DT, to the machining surface formation positions MPL and MPR. The offset values SVLL and SVNL are parameters in the left tool radius compensation, and the offset values SVLR and SVNR are parameters in the right tool radius compensation.

Therefore, the tool radius compensation amount calculation unit 201 recognizes the tool path TP included in the machining condition CP, and generates the tool radius compensation information TC including compensation information based on the tool path TP and compensation information based on the nozzle path NP, on the basis of the machining program PP and the machining condition CP. The tool radius compensation amount calculation unit 201 outputs the tool radius compensation information TC to the machining path calculation unit 202. In addition, the tool radius compensation amount calculation unit 201 outputs, to the machining path calculation unit 202, the tool radius compensation information TC including compensation information of both of the left tool radius compensation and the right tool radius compensation.

To the machining path calculation unit 202, the machining program PP and the machining condition CP are inputted from the CAM device 21 and the tool radius compensation information TC is inputted from the tool radius compensation amount calculation unit 201. The machining path calculation unit 202 translates the G code included in the machining program PP. It should be noted that the machining program PP may include a robot language or the like instead of the G code.

Based on the translation result, the machining program PP, the machining condition CP, and the tool radius compensation information TC, the machining path calculation unit 202 determines any of the cutting compensation conditions from among cutting with the left tool radius compensation by using the nozzle path NP, cutting with the right tool radius compensation by using the nozzle path NP, cutting with the left tool radius compensation by using the tool path TP, or cutting with the right tool radius compensation by using the tool path TP.

The machining path calculation unit 202 generates a tool radius compensation control signal TS based on the translation result, the machining program PP, the machining condition CP, the tool radius compensation information TC, and the determined cutting compensation condition. The machining path calculation unit 202 outputs the tool radius compensation control signal TS to the drive control unit 203. The drive control unit 203 generates a drive control signal CS that controls the machine main body 100 based on the tool radius compensation control signal TS. The drive control unit 203 outputs the drive control signal CS to the machine main body 100.

In the case of cutting with the left tool radius compensation by using the tool path TP, the drive control unit 203 generates the drive control signal CS based on the tool path TP, the control center point CL in the tool path TP, the tool radius compensation value MVLL, and the offset value SVLL. In the case of cutting with the right tool radius compensation by using the tool path TP, the drive control unit 203 generates the drive control signal CS based on the tool path TP, the control center point CL in the tool path TP, the tool radius compensation value MVLR, and the offset value SVLR.

In the case of cutting with the left tool radius compensation by using the nozzle path NP, the drive control unit 203 generates the drive control signal CS based on the nozzle path NP, the nozzle center point CN in the nozzle path NP, the tool radius compensation value MVNL, and the offset value SVNL. In the case of cutting with the right tool radius compensation by using the nozzle path NP, the drive control unit 203 generates the drive control signal CS based on the nozzle path NP, the nozzle center point CN in the nozzle path NP, the tool radius compensation value MVNR, and the offset value SVNR.

The drive control unit 203 controls the tool path control unit 300 of the machine main body 100 by the drive control signal CS. The tool path control unit 300 controls the path of the beam spot BS of the laser beam emitted from the opening portion 105 of the nozzle 106 based on the drive control signal CS.

With reference to FIGS. 3A, 3B, 4, and 5, a specific configuration example of the tool path control unit 300, and an example of the method in which the tool path control unit 300 vibrates the beam spot BS of the laser beam in the non-circular vibration pattern will be described as first to third embodiments.

First Embodiment

Figure 3A:
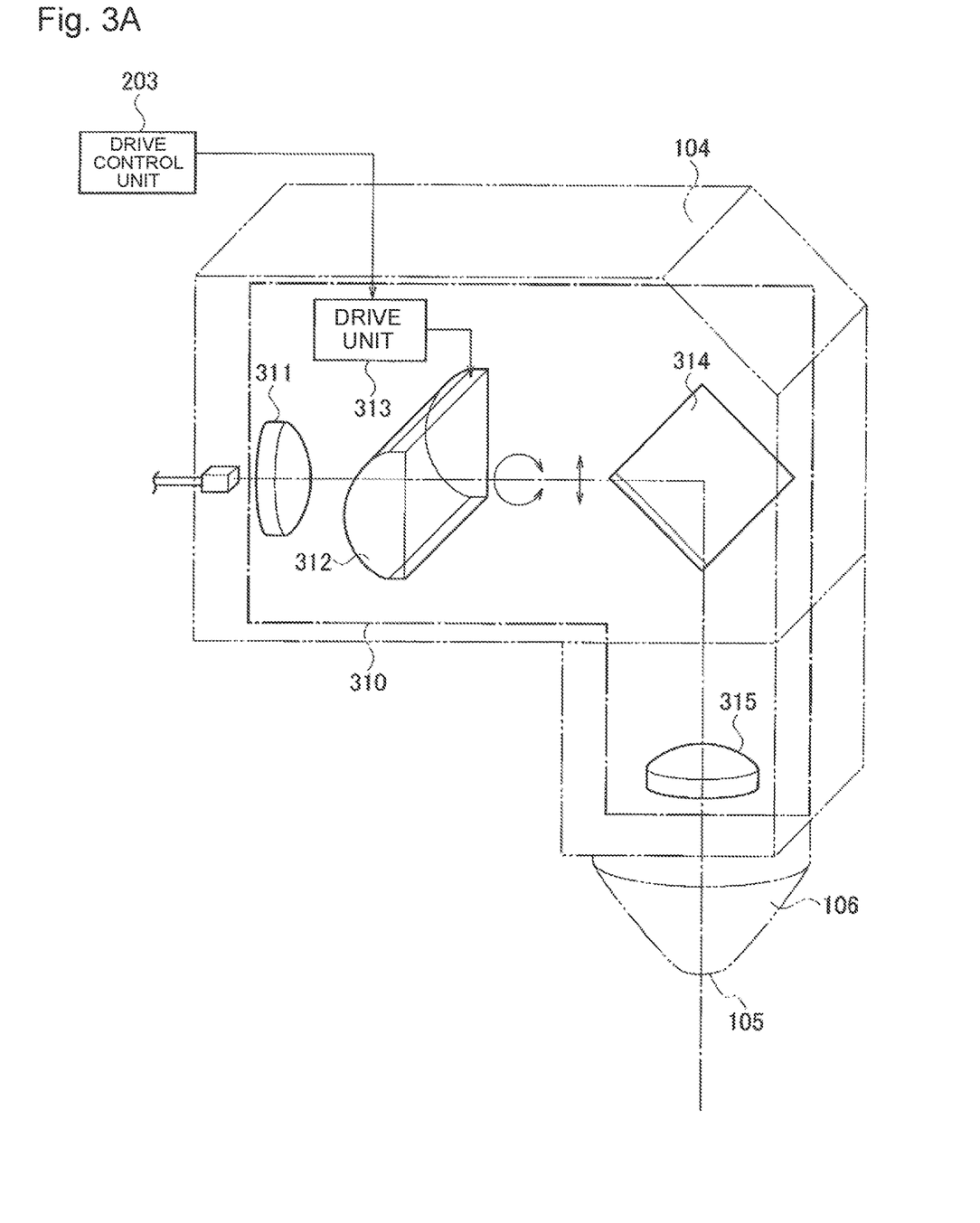
FIG. 3A is a diagram showing a configuration example (first embodiment) of the tool path control unit.

As shown in FIG. 3A, the tool path control unit 310 is housed inside the machining unit 104. The tool path control unit 310 shown in FIG. 3A is an embodiment of the tool path control unit 300 shown in FIG. 1. The tool path control unit 310 has a collimator lens 311, a cylindrical lens 312, a drive unit 313, a bend mirror 314, and a focusing lens 315.

The collimator lens 311 converts the laser beam emitted from the process fiber 11 into a parallel beam (collimated beam). The cylindrical lens 312 deforms the beam spot BS of the laser beam from a circular shape to an elliptical shape.

The drive unit 313 drives the cylindrical lens 312 under the control of the drive control unit 203. The drive unit 313 can reciprocally and rotationally vibrate the cylindrical lens 312 with an optical axis of the laser beam as a rotation axis, or reciprocally and linearly vibrate the cylindrical lens 312 in a direction orthogonal to the optical axis of the laser beam and in a radial direction of the cylindrical lens 312. The drive unit 313 vibrates the cylindrical lens 312 in a set vibration pattern.

The bend mirror 314 reflects the laser beam, which has been emitted from the cylindrical lens 312, downward in the Z-axis direction that is perpendicular to the X-axis and the Y-axis. The focusing lens 315 focuses the laser beam reflected by the bend mirror 314 to apply the laser beam to the workpiece W. The tool path control unit 310 is capable of allowing the cutting trace to have a variety of non-circular shapes by vibrating the cylindrical lens 312 in the set vibration pattern.

Figure 3B:
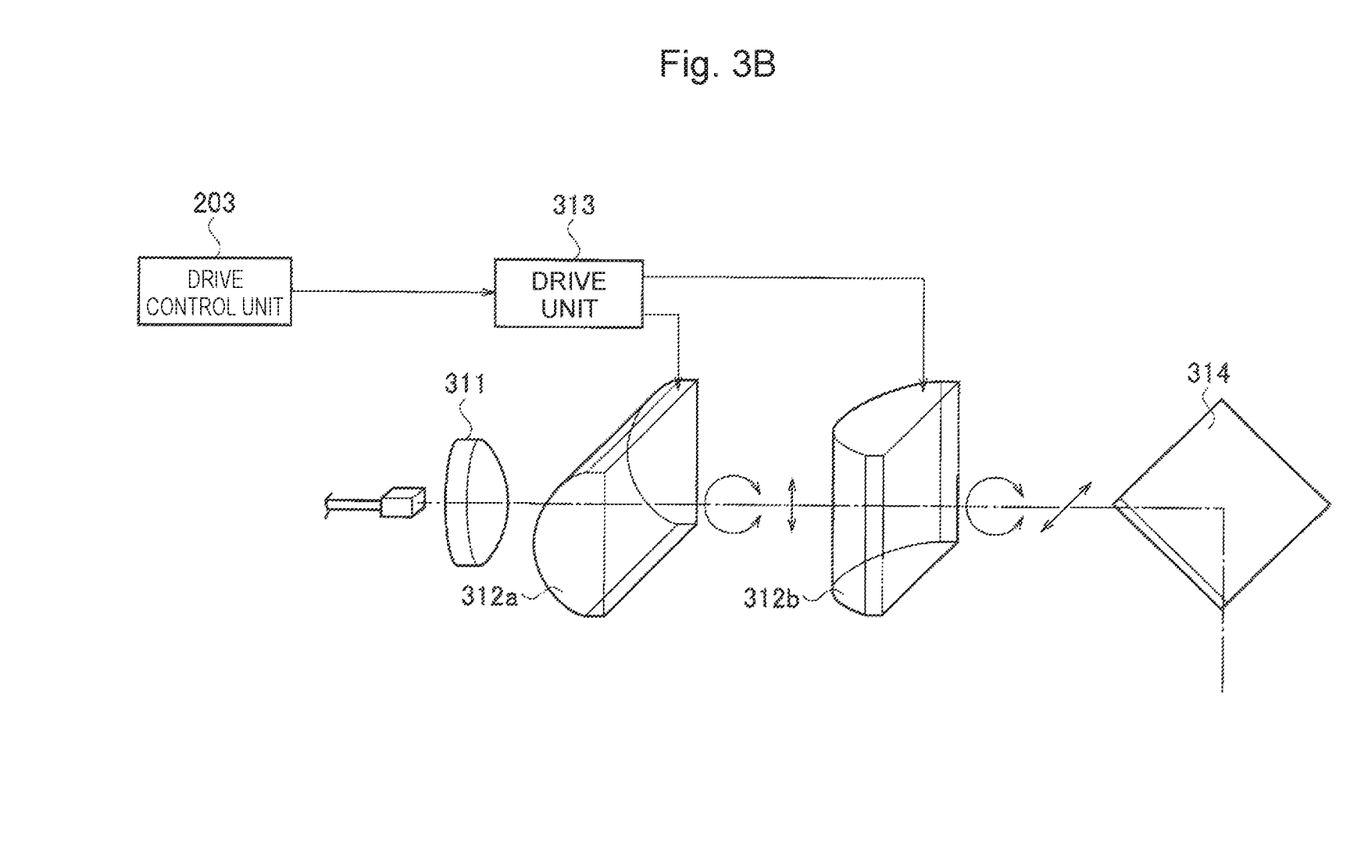
FIG. 3B is a diagram showing a configuration example (first embodiment) of the tool path control unit.

As shown in FIG. 3B, the tool path control unit 310 may be configured to have a plurality of cylindrical lenses 312a and 312b. The drive unit 313 can drive the cylindrical lenses 312a and 312b separately under the control of the drive control unit 203. The drive unit 313 can reciprocally and rotationally vibrate the cylindrical lens 312a with an optical axis of the laser beam as a rotation axis, or reciprocally and linearly vibrate the cylindrical lens 312a in a direction orthogonal to the optical axis of the laser beam and in a radial direction of the cylindrical lens 312a.

The drive unit 313 can reciprocally and rotationally vibrate the cylindrical lens 312b with the optical axis of the laser beam as a rotation axis, or reciprocally and linearly vibrate the cylindrical lens 312b in a direction orthogonal to the optical axis of the laser beam and in a radial direction of the cylindrical lens 312b. The drive unit 313 is capable of allowing the cutting trace to have a larger variety of non-circular shapes by vibrating the cylindrical lenses 312a and 312b in different vibration patterns.

Second Embodiment

Figure 4:
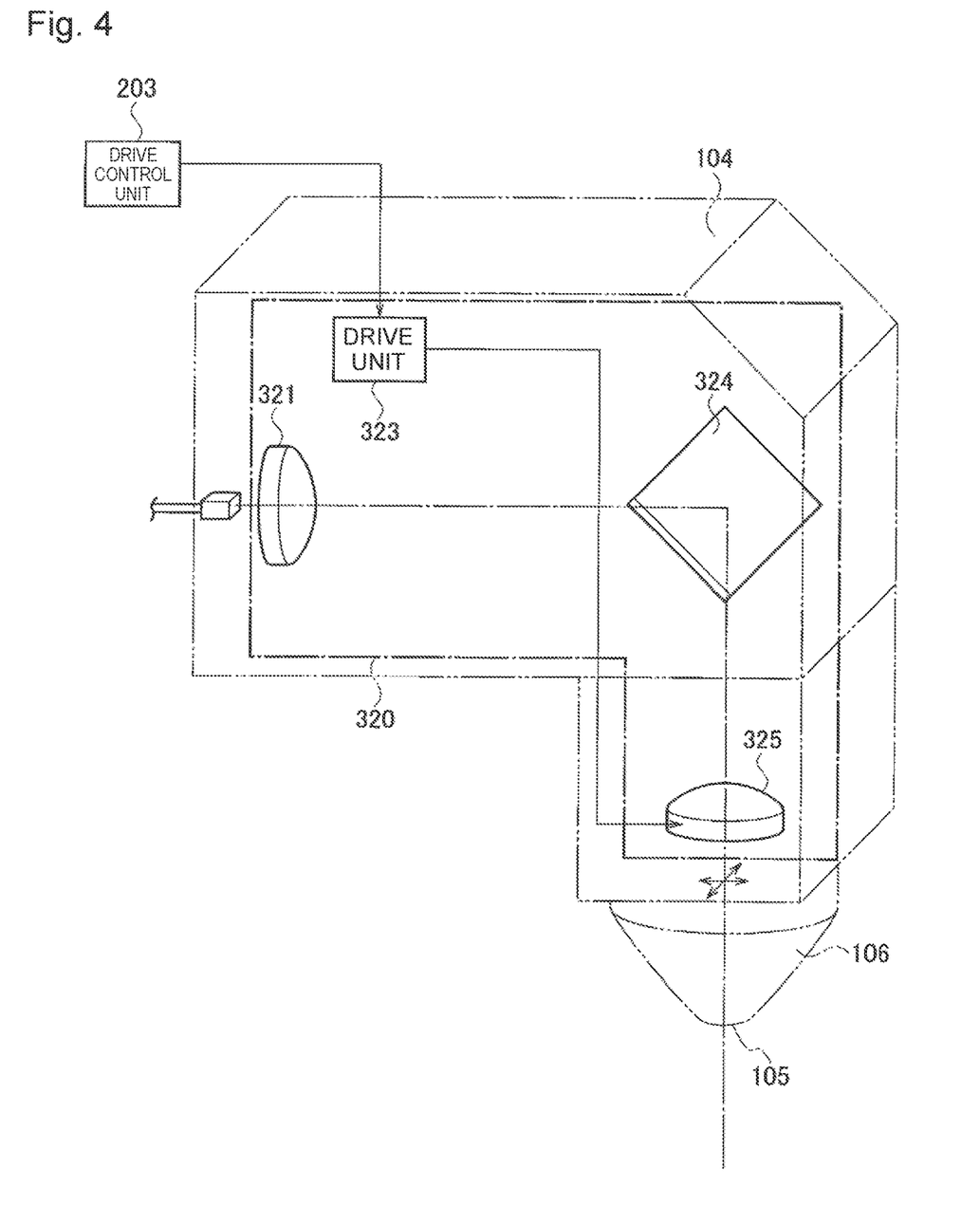
FIG. 4 is a diagram showing a configuration example (second embodiment) of the tool path control unit.

As shown in FIG. 4, a tool path control unit 320 is housed inside the machining unit 104. The tool path control unit 320 shown in FIG. 4 is an embodiment of the tool path control unit 300 shown in FIG. 1. The tool path control unit 320 has a collimator lens 321, a drive unit 323, a bend mirror 324, and a focusing lens 325. The collimator lens 321 converts the laser beam emitted from the process fiber 11 into a parallel beam.

The bend mirror 324 reflects the laser beam, which has been emitted from the collimator lens 321, downward in the Z-axis direction that is perpendicular to the X-axis and the Y-axis. The focusing lens 325 focuses the laser beam reflected by the bend mirror 324 to apply the focused laser beam to the workpiece W. The drive unit 323 drives the focusing lens 325 under the control of the drive control unit 203.

The drive unit 323 can shift the optical axis of the focusing lens 325 from the optical axis of the laser beam by driving the focusing lens 325 in the X-axis direction, the Y-axis direction, or an arbitrarily combined direction of the X-axis and the Y-axis. By shifting the optical axis of the focusing lens 325 in the X-axis direction, the Y-axis direction, or the arbitrarily combined direction of the X-axis and the Y-axis, the cutting trace is allowed to have a variety of non-circular shapes.

Third Embodiment

Figure 5:
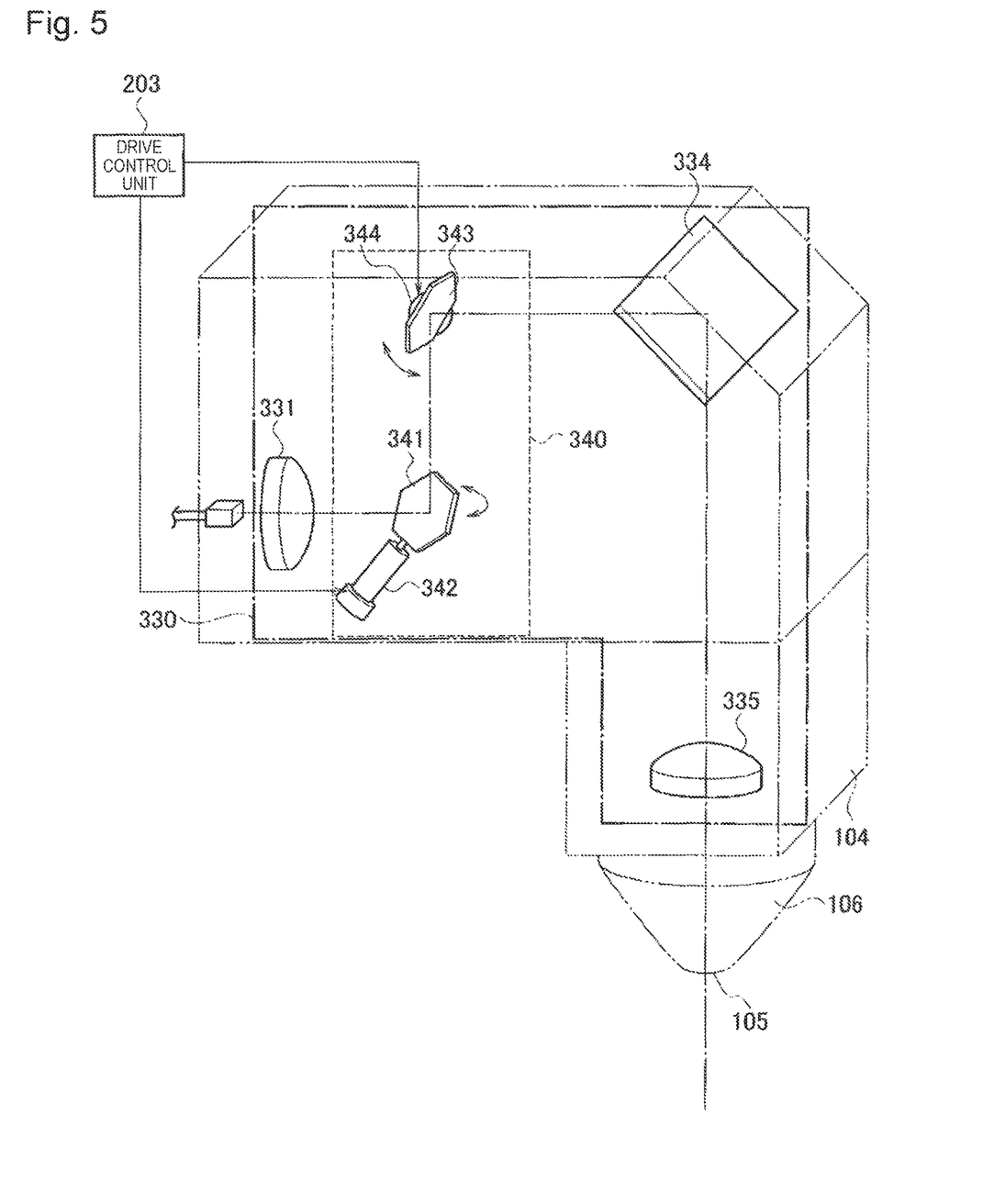
FIG. 5 is a diagram showing a configuration example (third embodiment) of the tool path control unit.

As shown in FIG. 5, a tool path control unit 330 is housed inside the machining unit 104. The tool path control unit 330 shown in FIG. 5 is an embodiment of the tool path control unit 300 shown in FIG. 1. The tool path control unit 330 has a collimator lens 331, a Galvano scanner unit 340, a bend mirror 334, and a focusing lens 335. The collimator lens 331 converts the laser beam emitted from the process fiber 11 into a parallel beam.

The Galvano scanner unit 340 has a scanning mirror 341 (a first scanning mirror), a drive unit 342 (a first drive unit) that rotationally drives the scanning mirror 341, a scanning mirror 343 (a second scanning mirror), and a drive unit 344 (a second drive unit) that rotationally drives the scanning mirror 343.

The drive unit 342 can reciprocally drive the scanning mirror 341 in a predetermined direction (for example, the X direction) within a predetermined angle range under the control of the drive control unit 203. The scanning mirror 341 reflects the laser beam, which has been converted into the parallel beam by the collimator lens 321, toward the scanning mirror 343.

The drive unit 344 can reciprocally drive the scanning mirror 343 in a direction different from the driving direction of the scanning mirror 341 (for example, the Y direction) within a predetermined angle range under the control of the drive control unit 203. The scanning mirror 343 reflects the laser beam, which has been reflected by the scanning mirror 341, toward the bend mirror 334.

The bend mirror 334 reflects the laser beam, which has been reflected by the scanning mirror 343, downward in the Z-axis direction that is perpendicular to the X-axis and the Y-axis. The focusing lens 335 focuses the laser beam reflected by the bend mirror 334 to apply the focuses laser beam to the workpiece W.

The Galvano scanner unit 340 is capable of allowing the tool path TP to have a variety of non-circular shapes by reciprocally vibrating any one or both of the scanning mirror 341 and the scanning mirror 343 at a high speed of, for example, 1,000 Hz or more. In other words, by focusing a laser beam having a certain intensity or more to a plurality of locations per unit time, the tool shape that comes into contact with the workpiece W and substantially contributes to the machining thereof can be arbitrarily allowed to have a variety of non-circular shapes.

The tool radius compensation amount calculation unit 201 generates the tool radius compensation information TC that includes the nozzle path NP, the cutting travelling direction DT, the tool path TP, the control center point CL in the tool path TP, the machining surface formation position MPLi or MPRi, the tool radius compensation value MVLL or MVLR, and the offset value SVLLi or SVLRi. The tool radius compensation amount calculation unit 201 outputs the tool radius compensation information TC to the machining path calculation unit 202.

The machining path calculation unit 202 generates the tool radius compensation control signal TS based on the translation result, the machining program PP, the machining condition CP, the tool radius compensation information TC, and the cutting compensation condition, and outputs the tool radius compensation control signal TS to the drive control unit 203. The drive control unit 203 generates the drive control signal CS that controls the machine main body 100 based on the tool radius compensation control signal TS.

The drive control unit 203 controls the machine main body 100 by the drive control signal CS. The machine main body 100 controls the nozzle path NP by driving the X-axis carriage 102 and the Y-axis carriage 103 based on the drive control signal CS. In addition, the machine main body 100 controls the tool path TP by driving the tool path control unit 300 based on the drive control signal CS.

Figure 6:
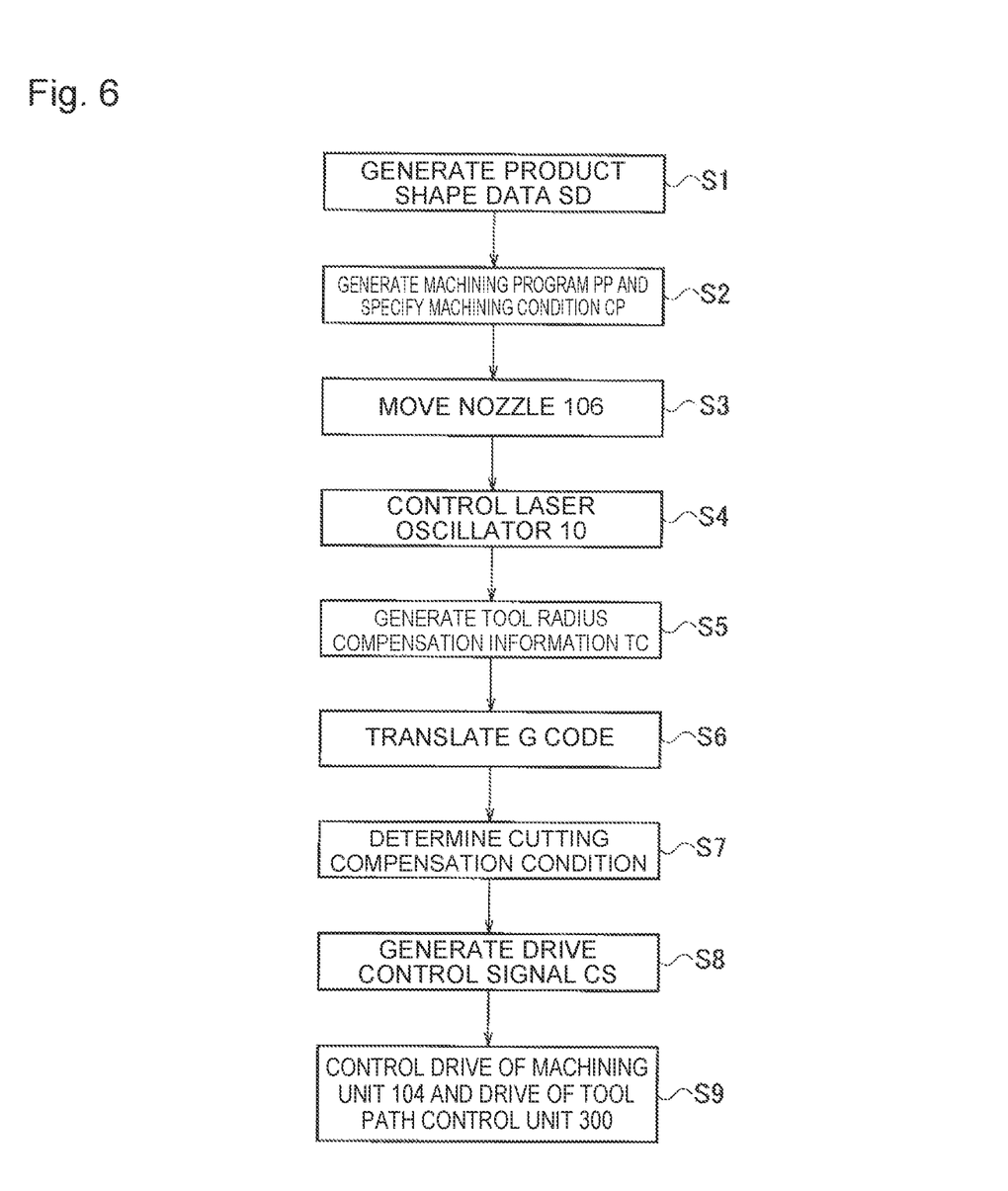
FIG. 6 is a flowchart showing an example of the cutting method according to the one or more embodiments.

An example of the cutting method will be described with reference to the flowchart shown in FIG. 6. In step S1, the CAD device 20 generates the product shape data SD based on the product shape information including the dimensions and the shape of the final machined product. Further, the CAD device 20 outputs the product shape data SD to the CAM device 21.

In step S2, the CAM device 21 generates the machining program PP (including the G code) of the cutting machine 1 based on the product shape data SD, and specifies the machining condition CP. Further, the CAM device 21 outputs the machining program PP and the machining condition CP to the NC device 200 of the cutting machine 1.

In step S3, the NC device 200 controls the machine main body 100 to drive the X-axis carriage 102 and the Y-axis carriage 103 based on the machining program PP and the machining condition CP so that the nozzle 106 is moved to an intended position.

In addition, in step S4, the NC device 200 controls the laser oscillator 10 based on the machining program PP and the machining condition CP to emit the laser beam from the opening portion 105 of the nozzle 106 and apply the laser beam to the workpiece W. The timing of step S3 and step S4 is controlled based on the machining program PP and the machining condition CP.

In step S2, the machining program PP and the machining condition CP are inputted from the CAM device 21 to the tool radius compensation amount calculation unit 201 and the machining path calculation unit 202 of the NC device 200. In step S5, the tool radius compensation amount calculation unit 201 recognizes the tool path TP included in the machining condition CP. Further, the tool radius compensation amount calculation unit 201 generates the tool radius compensation information TC based on the machining program PP and the machining condition CP. The tool radius compensation amount calculation unit 201 outputs the tool radius compensation information TC to the machining path calculation unit 202.

In step S6, the machining path calculation unit 202 translates the G code included in the machining program PP. In step S7, based on the translation result, the machining program PP, the machining condition CP, and the tool radius compensation information TC, the machining path calculation unit 202 determines the cutting compensation condition that includes whether to perform cutting with the left tool radius compensation by using the nozzle path NP, to perform cutting with the right tool radius compensation by using the nozzle path NP, to perform cutting with the left tool radius compensation by using the tool path TP, or to perform cutting with the right tool radius compensation by using the tool path TP.

The machining path calculation unit 202 generates the tool radius compensation control signal TS based on the machining program PP, the machining condition CP, the tool radius compensation information TC, and the determined cutting compensation condition, and outputs the tool radius compensation control signal TS to the drive control unit 203.

In step S8, the drive control unit 203 generates the drive control signal CS that controls the machine main body 100 based on the tool radius compensation control signal TS, and outputs the drive control signal CS to the machine main body 100. In step S9, the machine main body 100 controls the nozzle path NP by driving the machining units (specifically, the X-axis carriage 102 and the Y-axis carriage 103) based on the drive control signal CS. In addition, the machine main body 100 controls the tool path TP by driving the tool path control unit 300 based on the drive control signal CS.

In the cutting machine and the cutting method of the one or more embodiments, the tool radius compensation information TC including compensation information based on the tool path TP and compensation information based on the nozzle path NP is generated. In the cutting machine and the cutting method of the one or more embodiments, the nozzle path NP and the tool path TP are controlled by controlling the drive of the machining unit 104 and the drive of the tool path control unit 300 based on the tool radius compensation information TC. Therefore, according to the cutting machine and the cutting method of the one or more embodiments, the tool radius of the cutting tool can be accurately compensated even when the cutting trace has a non-circular shape in a state in which the tool path corresponding to the cutting tool or the relative position between the nozzle 106 and the machining table 101 is fixed.

The present invention is not limited to the one or more embodiments described above, and can be variously modified without deviating from the summary of the present invention. In the cutting machine and the cutting method of the one or more embodiments, the laser machining device and the laser machining method have been described as examples, but the present invention is also applicable to, for example, a water jet machining device.

The disclosure of the present application is related to the subject matter described in Japanese Patent Application No. 2018-128917 filed on Jul. 6, 2018, the entire disclosures of which are incorporated herein by reference.

The invention claimed is:

1. A cutting machine comprising:
a machine main body configured to cut a workpiece; and
a numerically control (NC) device configured to control the machine main body, wherein:
the machine main body comprises:
a machining unit configured to cut the workpiece by changing a relative position between the workpiece and a beam spot of a laser beam, comprising a nozzle attached at a tip portion of the machining unit and having an opening portion formed therein for radiating the laser beam to the workpiece; and
a tool path control unit configured to control a tool path based on a drive control signal, wherein the tool path is a path of the beam spot that is formed by vibrating the laser beam in a non-circular vibration pattern, and corresponds to a cutting tool and has a non-circular shape,
the NC device comprises:
a tool radius compensation amount calculation unit configured to generate tool radius compensation information for compensating a tool radius of the cutting tool to cut the workpiece based on a machining program and a machining condition set based on product shape information including dimensions and a shape of a final machined product obtained by cutting the workpiece,
the tool radius compensation information including a first tool radius compensation value in a left tool radius compensation and a second tool radius compensation value in a right tool radius compensation,
the first tool radius compensation value corresponding to a distance from a center line that passes a center point of the opening portion of the nozzle and is parallel to a traveling direction of the nozzle to a first machining surface formation position,
the second tool radius compensation value corresponding to a distance from the center line to a second machining surface formation position,
the first machining surface formation position being a position where a distance from the center line in a left side is maximum in the tool path, and
the second machining surface formation position being a position where a distance from the center line in a right side is maximum in the tool path;
a machining path calculation unit configured to determine a cutting compensation condition indicating the left tool radius compensation or the right tool radius compensation based on the machining program, the machining condition, and the tool radius compensation information, and to generate a tool radius compensation control signal based on the machining program, the machining condition, the tool radius compensation information, and the cutting compensation condition; and
a drive control unit configured to generate the drive control signal for controlling the machine main body based on the tool radius compensation control signal.

2. The cutting machine according to claim 1, wherein the machine main body further comprises a laser oscillator configured to be controlled by the NC device and to generate the laser beam, and
the tool path control unit is housed inside the machining unit, and controls the path of the beam spot of the laser beam emitted from the opening portion in the non-circular vibration pattern.

3. The cutting machine according to claim 2, wherein the tool radius compensation information includes a path of the nozzle, a cutting traveling direction, and the tool path.

4. The cutting machine according to claim 2, wherein the tool path control unit comprises:
a cylindrical lens configured to deform the beam spot of the laser beam; and
a drive unit configured to reciprocally and rotationally vibrate the cylindrical lens in a direction with an optical axis of the laser beam as a rotation axis, or reciprocally and linearly vibrate the cylindrical lens in a direction orthogonal to the optical axis of the laser beam and in a radial direction of the cylindrical lens.

5. The cutting machine according to claim 2, wherein the tool path control unit comprises:
a collimator lens configured to convert the laser beam into a parallel beam;

a focusing lens configured to focus the laser beam having been converted into the parallel beam and apply the parallel beam to the workpiece; and a drive unit configured to drive the focusing lens to shift an optical axis of the focusing lens from an optical axis of the laser beam.

6. The cutting machine according to claim 2, wherein the tool path control unit comprises:

first and second scanning mirrors configured to reflect the laser beam;

a first drive unit configured to reciprocally drive the first scanning mirror in a predetermined direction within a predetermined angle range; and a second drive unit configured to reciprocally drive the second scanning mirror in a direction different from the driving direction of the first scanning mirror within a predetermined angle range.

7. A cutting method comprising:

setting a machining program and a machining condition based on product shape information including dimensions and a shape of a final machined product obtained by cutting a workpiece;

generating tool radius compensation information for compensating a tool radius of a cutting tool to cut the workpiece based on the machining program and the machining condition, the tool radius compensation information including a first tool radius compensation value in a left tool radius compensation and a second tool radius compensation value in a right tool radius compensation, the first tool radius compensation value corresponding to a distance from a center line that passes a center point of an opening portion of a nozzle through which a laser beam passes and is parallel to a traveling direction of the nozzle to a first machining surface formation position, the second tool radius compensation value corresponding to a distance from the center line to a second machining surface formation position, the first machining surface formation position being a position where a distance from the center line in a left side is maximum in a tool path, and the second machining surface formation position being a position where a distance from the center line in a right side is maximum in the tool path, wherein the tool path is a path of a beam spot that is formed by vibrating the laser beam in a non-circular vibration pattern, and corresponds to the cutting tool and has a non-circular shape;

determining a cutting compensation condition indicating the left tool radius compensation or the right tool radius compensation based on the machining program, the machining condition, and the tool radius compensation information;

generating a tool radius compensation control signal based on the machining program, the machining condition, the tool radius compensation information, and the cutting compensation condition;

generating a drive control signal for controlling a machine main body based on the tool radius compensation control signal;

moving the nozzle to an intended position based on the machining program and the machining condition;

radiating the laser beam to the workpiece from the opening portion based on the machining program and the machining condition; and controlling the tool path based on the drive control.

8. The cutting method according to claim 7, wherein the tool radius compensation information includes a path of the nozzle, a cutting traveling direction, and the tool path.

9. A cutting machine comprising:

a machine main body configured to cut a workpiece; and a numerically control (NC) device configured to control the machine main body, wherein the machine main body comprises:

a machining unit configured to cut the workpiece by changing a relative position between the workpiece and a beam spot of a laser beam, comprising a nozzle attached at a tip portion of the machining unit and having an opening portion formed therein for radiating the laser beam to the workpiece; and a tool path control unit configured to control a tool path based on a drive control signal, wherein the tool path is a path of the beam spot that is formed by vibrating the laser beam in a non-circular vibration pattern, and corresponds to a cutting tool and has a non-circular shape, wherein:

the tool path control unit comprises any one of (a), (b), and (c), (a) a cylindrical lens configured to deform the beam spot of the laser beam; and a drive unit configured to reciprocally and rotationally vibrate the cylindrical lens in a direction with an optical axis of the laser beam as a rotation axis, or reciprocally and linearly vibrate the cylindrical lens in a direction orthogonal to the optical axis of the laser beam and in a radial direction of the cylindrical lens, (b) a collimator lens configured to convert the laser beam into a parallel beam; a focusing lens configured to focus the laser beam having been converted into the parallel beam and apply the parallel beam to the workpiece; and a drive unit configured to drive the focusing lens to shift an optical axis of the focusing lens from an optical axis of the laser beam, (c) first and second scanning mirrors configured to reflect the laser beam; a first drive unit configured to reciprocally drive the first scanning mirror in a predetermined direction within a predetermined angle range; and a second drive unit configured to reciprocally drive the second scanning mirror in a direction different from the driving direction of the first scanning mirror within a predetermined angle range, the NC device:

generates tool radius compensation information for compensating a tool radius of the cutting tool to cut the workpiece based on a machining program and a machining condition set based on product shape information including dimensions and a shape of a final machined product obtained by cutting the workpiece, the tool radius compensation information including a first tool radius compensation value in a left tool radius compensation and a second tool radius compensation value in a right tool radius compensation, the first tool radius compensation value corresponding to a distance from a center line that passes a center point of the opening portion of the nozzle and is parallel to a traveling direction of the nozzle to a first machining surface formation position, the second tool radius compensation value corresponding to a distance from the center line to a second machining surface formation position, the first machining surface formation position being a position where a distance from the center line in a left side is maximum in the tool path, and the second machining surface formation position being a position where a distance from the center line in a right side is maximum in the tool path;

determines a cutting compensation condition indicating the left tool radius compensation or the right tool radius compensation based on the machining program, the machining condition, and the tool radius compensation information;

generates a tool radius compensation control signal based on the machining program, the machining condition, the tool radius compensation information, and the cutting compensation condition; and generates the drive control signal for controlling the machine main body based on the tool radius compensation control signal.

\* \* \* \* \*